(12) United States Patent
Furuya et al.

(10) Patent No.: US 12,510,465 B2
(45) Date of Patent: Dec. 30, 2025

(54) GAS DETECTION DEVICE

(71) Applicant: Asahi Kasei Microdevices Corporation, Tokyo (JP)

(72) Inventors: Takaaki Furuya, Tokyo (JP); Akinori Itabashi, Tokyo (JP); Hans Martin, Delsbo (SE)

(73) Assignee: Asahi Kasei Microdevices Corporation, Tokyo (JP)

( * ) Notice: Subject to any disclaimer, the term of this patent is extended or adjusted under 35 U.S.C. 154(b) by 306 days.

(21) Appl. No.: 18/304,346

(22) Filed: Apr. 21, 2023

(65) Prior Publication Data

US 2023/0349814 A1 Nov. 2, 2023

(30) Foreign Application Priority Data

Apr. 27, 2022 (JP) ................. 2022-073747

(51) Int. Cl.
*G01N 21/03* (2006.01)
*G01N 21/61* (2006.01)

(52) U.S. Cl.
CPC ......... *G01N 21/0303* (2013.01); *G01N 21/61* (2013.01); *G01N 2021/0378* (2013.01)

(58) Field of Classification Search
CPC .................................................... G01N 21/61
See application file for complete search history.

(56) References Cited

U.S. PATENT DOCUMENTS

| 4,657,397 A * | 4/1987 | Oehler | G02B 6/4298 250/353 |
| 2004/0169863 A1 | 9/2004 | Kawate | |
| 2006/0086903 A1 * | 4/2006 | Hopkins | G01N 21/3504 250/339.13 |
| 2014/0002825 A1 | 1/2014 | Kawate et al. | |
| 2015/0219491 A1 * | 8/2015 | Lee | G01N 21/3504 250/227.24 |
| 2018/0348121 A1 | 12/2018 | Deliwala | |
| 2020/0018699 A1 * | 1/2020 | Kawasaki | G01N 21/41 |
| 2021/0096069 A1 * | 4/2021 | Kurosawa | G02B 19/0085 |
| 2022/0026352 A1 | 1/2022 | Afshar | |

FOREIGN PATENT DOCUMENTS

| JP | S59501281 A | 7/1984 | |
| JP | H0736052 U | 7/1995 | |
| JP | 2004257956 A | 9/2004 | |
| JP | 2012185121 A | 9/2012 | |
| JP | 2021148782 A | 9/2021 | |
| WO | WO-2020225977 A1 * | 11/2020 | ............. G01N 21/03 |

* cited by examiner

*Primary Examiner* — Uzma Alam
*Assistant Examiner* — Alexandria Mendoza
(74) *Attorney, Agent, or Firm* — KENJA IP LAW PC

(57) ABSTRACT

Provided is a gas detection device that is compact and can perform accurate measurement. The gas detection device includes a light-emitting section (10), a light-receiving section (20), and a light-guiding section (30) that guides light from the light-emitting section (10) to the light-receiving section (20). The light-guiding section (30) includes a mirror (50) and has a shape of part of at least one spheroid. The mirror (50) is provided at a position of or in proximity to a first focal point of the spheroid. The light-emitting section (10) and the light-receiving section (20) are each provided at a position of or in proximity to a focal point of the spheroid that is not the first focal point. The light-emitting section (10) and the light-receiving section (20) are arranged in parallel to a major axis direction of the spheroid.

10 Claims, 11 Drawing Sheets

GAS DETECTION DEVICE

CROSS-REFERENCE TO RELATED APPLICATION

This application claims priority of Japanese Patent Application No. 2022-073747 (filed Apr. 27, 2022), the entire contents of which are incorporated herein by reference.

TECHNICAL FIELD

The present disclosure relates to a gas detection device.

BACKGROUND

Gas detection devices that detect gases are used in various fields. For example, Patent Literature (PTL) 1 discloses a device that includes a light source for emitting infrared light and a detector for detecting infrared light of a specific wavelength inside of a case having an ellipsoidal inner surface (ellipsoidal mirror) and that is configured such that a gas that is to be detected is introduced into the case.

CITATION LIST

Patent Literature

PTL 1: US20180348121A1
PTL 2: JP2004-257956A

SUMMARY

FIG. 9 is a diagram for describing a problem of blurring of a formed image that arises in a gas detection device having an ellipsoidal mirror. A light source (light-emitting section 110) and a light-receiving section 120 are provided at the positions of focal points of an ellipsoid inside of a case. Light emitted from the light-emitting section 110 of the gas detection device is reflected at a plurality of positions at an inner surface of the ellipsoid, and a plurality of light rays collect at the light-receiving section 120. In this case, one optical path illustrated in FIG. 9 has a distance a up to a reflection point and then has a distance b up to the light-receiving section 120 after reflection. Another optical path has a distance a' up to a reflection point and then has a distance b' up to the light-receiving section 120 after reflection. The respective image magnifications for these optical paths at a light-receiving surface of the light-receiving section 120 are b/a and b'/a'. Image blurring may arise in a case in which a light-guiding section is formed of one ellipsoidal mirror because an image having a plurality of magnifications is formed at the light-receiving section 120.

PTL 2, for example, discloses an optical system having a double elliptical prism mirror. A straight line passing through three focal points is taken to be an optical axis, and a light source (light-emitting section) and a detector (light-receiving section) are arranged on the optical axis outside of the double elliptical prism mirror. Moreover, a sample is arranged at a shared focal point of the double ellipse, and an irradiation-side beam switching mirror and an emission-side beam switching mirror are arranged at the remaining two focal points. Through control of the orientations of these beam switching mirrors, it is possible to obtain an optical arrangement that enables irradiation of the sample with light at any incident angle and detection of emitted light at any angle from the sample. The optical system in PTL 2 enables optical path control but requires the beam switching mirrors to be included inside of the double elliptical prism mirror. Accordingly, miniaturization of a gas detection device is not possible when such an optical system is adopted. Moreover, since the light-emitting section and the light-receiving section are assumed to be outside of the double elliptical prism mirror in this optical system, it is not possible to adopt such an optical system in this form with respect to a compact gas detection device that includes a light-emitting section and a light-receiving section inside of a case.

In view of these points, an object of the present disclosure is to provide a gas detection device that is compact and can perform accurate measurement.

A gas detection device according to an embodiment of the present disclosure comprises:
a light-emitting section; a light-receiving section; and a light-guiding section that guides light from the light-emitting section to the light-receiving section, wherein
the light-guiding section includes a mirror and has a shape of part of at least one spheroid,
the mirror is provided at a position of a first focal point of the spheroid or in proximity to the first focal point,
the light-emitting section and the light-receiving section are each provided at a position of a focal point of the spheroid that is not the first focal point or in proximity to the focal point that is not the first focal point, and
the light-emitting section and the light-receiving section are arranged in parallel to a major axis direction of the spheroid.

According to the present disclosure, it is possible to provide a gas detection device that is compact and can perform accurate measurement.

BRIEF DESCRIPTION OF THE DRAWINGS

In the accompanying drawings.

DETAILED DESCRIPTION

Figure 1:
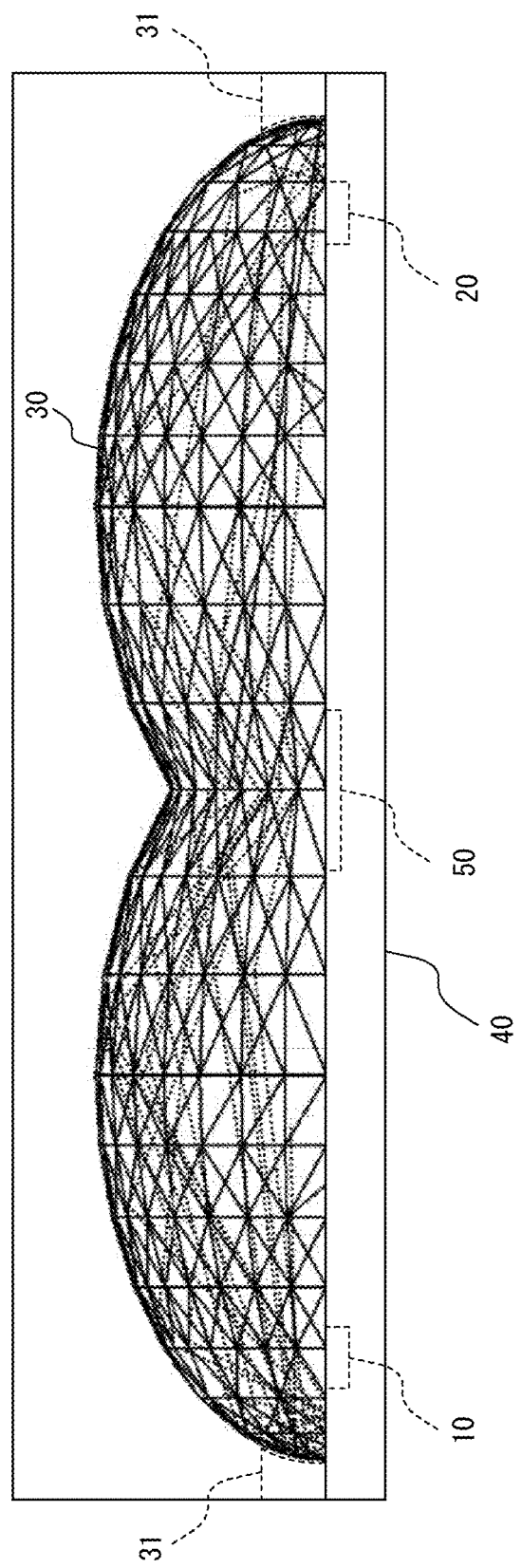
FIG. 1 is a diagram illustrating a configuration example of a gas detection device according to an embodiment of the present disclosure.

The following describes gas detection devices according to embodiments of the present disclosure with reference to the drawings. Parts in the drawings that are the same or correspond are allotted the same reference signs. In description of the present embodiments, descriptions of parts that are the same or correspond may be omitted or abbreviated as appropriate.

First Embodiment

FIG. 1 is a diagram of a gas detection device according to a first embodiment. The gas detection device is a device that performs concentration measurement of a gas that is to be detected among gases. In the present embodiment, the gas detection device is a non-dispersive infrared (NDIR) device that measures the concentration of a gas that is to be detected based on infrared light that has passed through introduced gas. The gas that is to be detected may be carbon dioxide, water vapor, carbon monoxide, nitrogen monoxide, ammonia, sulfur dioxide, alcohol, formaldehyde, methane, propane, or the like, for example. In one example, the gas detection device may be a compact device of 7 mm (width)×9 mm (length)×3 mm (height) and may also be referred to as a gas sensor.

The gas detection device includes a light-emitting section 10, a light-receiving section 20, and a light-guiding section 30 that guides light from the light-emitting section 10 to the light-receiving section 20. The light-guiding section 30 includes a mirror 50 and has a shape of part of at least one spheroid. In the present embodiment, the term "spheroid" refers to an ellipsoid that can be formed by rotating an ellipse around its major axis (i.e., a prolate spheroid). The gas detection device may further include gas ports 31. Moreover, the gas detection device may further include a holding section 40. Furthermore, the gas detection device may additionally include a control section that controls at least one of the light-emitting section 10 and the light-receiving section 20.

In FIG. 1 and subsequently referred to drawings, Cartesian coordinates are set in correspondence with the orientation of the gas detection device. The x-axis direction is a direction parallel to a major axis direction of the spheroid(s) for which the light-guiding section 30 has part of the shape thereof. The z-axis direction is a height direction of the gas detection device. The y-axis direction corresponds to a minor axis direction of the spheroid(s) that is orthogonal to the x-axis direction and the z-axis direction. Positional relationships are described below using the axes of these Cartesian coordinates.

Figure 2:
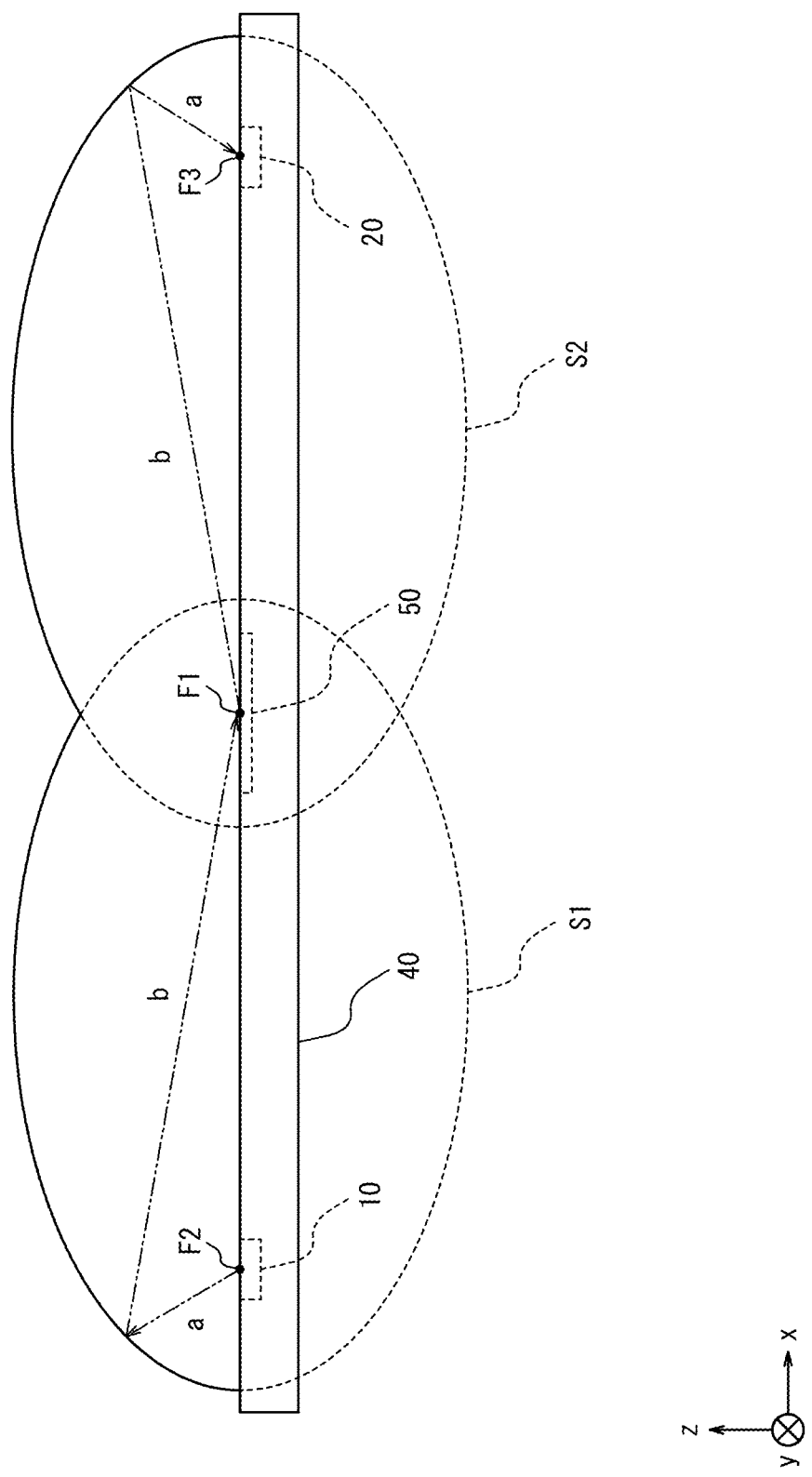
FIG. 2 is a diagram for describing an arrangement example of constituent elements of the gas detection device in FIG. 1.

FIG. 2 is a diagram for describing an arrangement example of constituent elements of the gas detection device in FIG. 1. As illustrated in FIG. 1 and FIG. 2, the gas detection device according to the present embodiment includes a light-emitting section 10, a light-receiving section 20, and a light-guiding section 30 that are held by a holding section 40. The gas detection device may further include a control section that is held by the holding section 40.

A light-emitting surface of the light-emitting section 10 and a light-receiving surface of the light-receiving section 20 are in contact with a space (detection space) that is between an inner surface of the light-guiding section 30 and an upper surface of the holding section 40. In addition, the light-guiding section 30 includes gas ports 31 in order that gas can be introduced into and withdrawn from the detection space.

Light emitted from the light-emitting section 10 is reflected at least once at the inner surface of the light-guiding section 30, which includes a reflecting surface of a mirror 50, and then reaches the light-receiving section 20.

In the present embodiment, the mirror 50 is provided at a position of a first focal point F1 of the spheroid(s) as illustrated in FIG. 2. Note that in the present disclosure, the mirror 50 may be provided at the position of the first focal point F1 or in proximity to the first focal point F1. A preferred range for "in proximity to a focal point" is described further below. In the present embodiment, the light-emitting section 10 and the light-receiving section 20 are each provided at a position of a focal point of the spheroid(s) that is not the first focal point F1. Moreover, the light-emitting section 10 and the light-receiving section 20 are arranged in parallel to the major axis direction of the spheroid(s). In the present disclosure, the light-emitting section 10 and the light-receiving section 20 may each be arranged at the position of a focal point of the spheroid(s) or in proximity to the focal point. In a more detailed description of the example in FIG. 2, the light-guiding section 30 has a shape of part of two spheroids S1 and S2 that share the first focal point F1. The two spheroids S1 and S2 also share a major axis. Moreover, when a focal point of one spheroid (spheroid S1) among the two spheroids that is not the first focal point F1 is taken to be a second focal point F2 and a focal point of the other spheroid (spheroid S2) among the two spheroids that is not the first focal point F1 is taken to be a third focal point F3, the light-emitting section 10 is provided at a position of the second focal point F2 and the light-receiving section 20 is provided at a position of the third focal point F3.

The following provides a detailed description of the constituent members of the gas detection device according to the present embodiment.

<Light-Emitting Section>

The light-emitting section 10 is a component that emits light used in detection of a gas that is to be detected. No specific limitations are placed on the light-emitting section 10 so long as it outputs light including a wavelength that is absorbed by the gas that is to be detected. The light emitted by the light-emitting section 10 is infrared light in the present embodiment, but is not limited to infrared light.

The light-emitting section 10 includes a light-emitting element. In the present embodiment, the light-emitting element is a light-emitting diode (LED). In another example, the light-emitting element may be a lamp, a laser (Light Amplification by Stimulated Emission of Radiation), an organic light-emitting element, a micro-electromechanical systems (MEMS) heater, or the like. Moreover, the light-emitting section 10 may include not only a light-emitting element, but also a passive element that receives light emitted from the light-emitting element and passively emits light. The passive element may be a reflector, an optical filter, a phosphor, an optical image, an optical fiber, a light waveguide, a lens, a diffraction grating, or the like, for example. From a viewpoint of miniaturization, it is preferable that the light-emitting section 10 includes a semiconductor light-emitting element (one example of which is an LED). The light-emitting element is preferably a surface light source having a planar shape.

<Light-Receiving Section>

The light-receiving section 20 is a component that receives light that has passed through an introduced gas. No specific limitations are placed on the light-receiving section 20 so long as it has sensitivity to a band of light including a wavelength that is absorbed by the gas that is to be detected. The light received by the light-receiving section 20 is infrared light in the present embodiment, but is not limited to infrared light.

The light-receiving section 20 includes a light-receiving element. In the present embodiment, the light-receiving element is a photodiode. In another example, the light-receiving element may be a phototransistor, a thermopile, a pyroelectric sensor, a bolometer, a photoacoustic detector, or the like. Moreover, the light-receiving section 20 may include not only a light-receiving element, but also an indirect element that guides light to the light-receiving element. The indirect element may be a reflector, an optical filter, a phosphor, a lens, a diffraction grating, an optical fiber, a light waveguide, or the like, for example. From a viewpoint of miniaturization, it is preferable that the light-receiving section 20 includes a semiconductor light-receiving element (one example of which is a photodiode).

<Light-Guiding Section>

The light-guiding section 30 is a member that guides light emitted from the light-emitting section 10 to the light-receiving section 20 and constitutes an optical system of the gas detection device. Light emitted from the light-emitting section 10 is reflected at least once at the inner surface of the light-guiding section 30, which includes a reflecting surface of a mirror 50, and then reaches the light-receiving section 20 as previously described. In the present embodiment, the mirror 50 is arranged such that the reflecting surface is parallel to the major axis direction of the spheroid(s) (parallel to the x-axis) as illustrated in FIG. 2.

In the present embodiment, the inner surface of the light-guiding section 30 is a reflecting surface. As previously described, the inner surface of the light-guiding section 30 has a shape of part of at least one spheroid. The light-guiding section 30 may supplementarily further include a reflector, a lens, a diffraction grating, an optical filter, or the like, in addition to the mirror 50. The mirror 50 may include a wavelength-selective reflecting filter.

The material forming the inner surface of the light-guiding section 30 and the reflecting surface of the mirror 50 may be metal, glass, ceramic, stainless steel, or the like, for example, but is not limited thereto. From a viewpoint of improving detection sensitivity, it is preferable that these reflecting surfaces are formed of a material having a low light absorption coefficient and high reflectance. More specifically, a resin housing that is coated with an alloy containing aluminum, gold, or silver, a dielectric, or a laminate of these materials is preferable. The material of the resin housing may be a liquid-crystal polymer (LCP), polypropylene (PP), polyether ether ketone (PEEK), polyamide (PA), polyphenylene ether (PPE), polycarbonate (PC), polyphenylene sulfide (PPS), polymethyl methacrylate resin (PMMA), polyarylate resin (PAR), or the like, or a hard resin that is a mixture of two or more of these resins, for example. A resin housing coated with gold or an alloy layer containing gold is preferable from a viewpoint of reliability and degradation over time. Moreover, a dielectric laminate film is preferably formed on the surface of the metal layer in order to increase reflectance. Formation of the inner surface of the light-guiding section 30 by vapor deposition or plating on a resin housing enables higher productivity and improved weight reduction compared to a case in which a metal material is used for formation thereof. Moreover, thermal deformation can be suppressed and variation of sensitivity can be restricted because there is a smaller thermal expansion coefficient difference with the holding section 40.

Although the light-guiding section 30 may be shaped by cutting, it is more preferable to shape the light-guiding section 30 by injection molding from a viewpoint of productivity.

<Holding Section>

The holding section 40 is a member that holds the light-emitting section 10, the light-receiving section 20, and the light-guiding section 30. The term "holding" means acting against external force to maintain the relative positional relationship of each member. No specific limitations are placed on the form of holding. In a case in which the gas detection device includes a control section, the holding section 40 may also hold the control section.

The holding section 40 is not limited to a particular member so long as it is a member that can hold the light-emitting section 10, the light-receiving section 20, and the light-guiding section 30. In the present embodiment, the holding section 40 is a resin package. In the present embodiment, a lead frame is included inside of the resin package, and the light-emitting section 10 and the light-receiving section 20 are electrically connected to the lead frame through wires or the like. In a case in which the gas detection device includes a control section, the light-emitting section 10, the light-receiving section 20, and the control section may be electrically connected via the lead frame. In another example, the holding section 40 may be a semiconductor substrate, a printed board, a ceramic package, or the like. In a case in which the holding section 40 is a semiconductor substrate, for example, the light-emitting section 10 and the light-receiving section 20 may be formed on the semiconductor substrate. In a case in which the holding section 40 is a printed board, for example, the light-emitting section 10 and the light-receiving section 20 may be electrically and mechanically connected by solder. The light-guiding section 30 is mechanically held to the holding section 40 by an adhesive, screws, claws, fitting, grommets, welding, or the like. The holding section 40 may include a connection terminal for electrically connecting the gas detection device to an external device.

<Control Section>

The control section is a member that controls at least one of the light-emitting section 10 and the light-receiving section 20. The control section may include an analog-to-digital conversion circuit that converts an analog electrical signal output from the light-receiving section 20 to a digital electrical signal. In addition, the control section may include a computation section that computes the concentration of the gas that is to be detected based on the converted to digital electrical signal. The control section may be included in the gas detection device or may be provided as an external device that is electrically connected to the gas detection device.

The control section may include at least one of a general-purpose processor that executes a function corresponding to a read-in program and a dedicated processor that is specialized for a specific process. The dedicated processor may include an application specific integrated circuit (ASIC). The processor may include a programmable logic device (PLD).

<Description of Principle>

Figure 9:
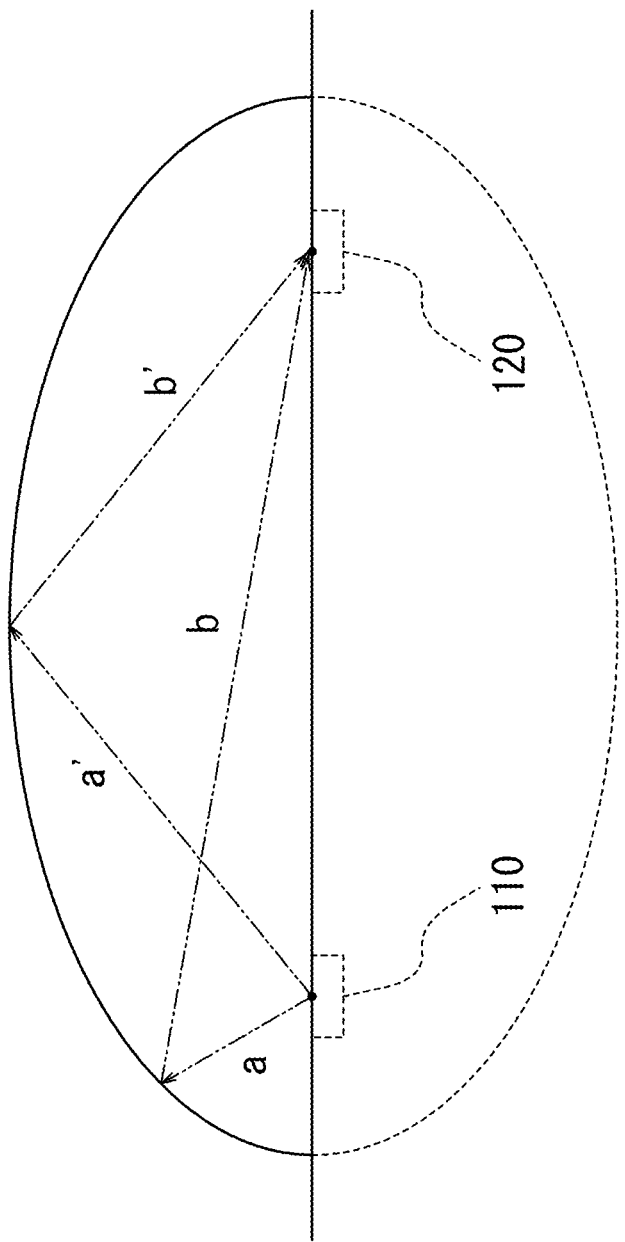
FIG. 9 is a diagram for describing a problem of blurring of a formed image that arises in a gas detection device having an ellipsoidal mirror.

As previously described with reference to FIG. 9, image blurring arises in a gas detection device having a conventional structure including an ellipsoidal mirror because an image having a plurality of magnifications forms at a light-receiving surface. The light-guiding section 30 of the gas detection device according to the present embodiment has a shape of part of two spheroids S1 and S2 having a shared first focal point F1 as illustrated in FIG. 2. Moreover, the light-emitting section 10 is provided at a position of a second focal point F2 (focal point of the spheroid S1 that is not the first focal point F1), and the light-receiving section 20 is provided at a position of a third focal point F3 (focal point of the spheroid S2 that is not the first focal point F1). Light emitted from the light-emitting section 10 is reflected at a reflection point (first reflection point) of the spheroid S1, is then reflected at the reflecting surface of the mirror 50, is then reflected at a reflection point (second reflection point) of the spheroid S2, and then reaches the light-receiving section 20.

In the gas detection device according to the present embodiment, the distance from the light-emitting section 10 to the first reflection point is a and the distance from the first reflection point to the reflecting surface of the mirror 50 is b. Moreover, the distance from the reflecting surface of the mirror 50 to the second reflection point is b, and the distance from the second reflection point to the light-receiving section 20 is a. In this case, the magnification of an image at the mirror 50 is b/a, and this image is then magnified by a/b in an optical path from the mirror 50 to the light-receiving section 20. In other words, in the gas detection device according to the present embodiment, an image of ×1 magnification is formed at the light-receiving section 20 irrespective of the positions of the reflecting points (irrespective of the optical path), and thus image blurring can be suppressed. Lack of image blurring means that high intensity light can be received within a certain range at the light-receiving surface and that variation of the amount of light with respect to variation in the measurement environment is reduced. This enables high-accuracy measurement in concentration measurement of the gas that is to be detected.

Moreover, the light-emitting section 10 and the light-receiving section 20 can each include a semiconductor element, and a compact gas detection device including the light-emitting section 10 and the light-receiving section 20 inside of a case is realized. Accordingly, the gas detection device according to the present embodiment is compact and can perform accurate measurement of the gas that is to be detected.

In the example in FIG. 2, the light guide 30 has a shape of part of two spheroids S1 and S2 that share the first focal point F1. However, the number of spheroids may be an even number without limitation to being two. In other words, the light-guiding section 30 may have a shape of part of a plurality of spheroids for which the total number thereof is an even number and for which adjacent spheroids share one focal point. The plurality of spheroids share a major axis. The mirror 50 is arranged at the position of a focal point that is shared by adjacent spheroids. The light-emitting section 10 is arranged at one focal point among focal points that are not shared (focal points at both ends in the major axis direction of the spheroids), and the light-receiving section 20 is arranged at the other of these focal points. So long as the number of spheroids is an even number, an image of ×1 magnification can be formed at the light-receiving section 20 and image blurring can be suppressed in the same manner as in the example in FIG. 2.

Second Embodiment

Figure 3:
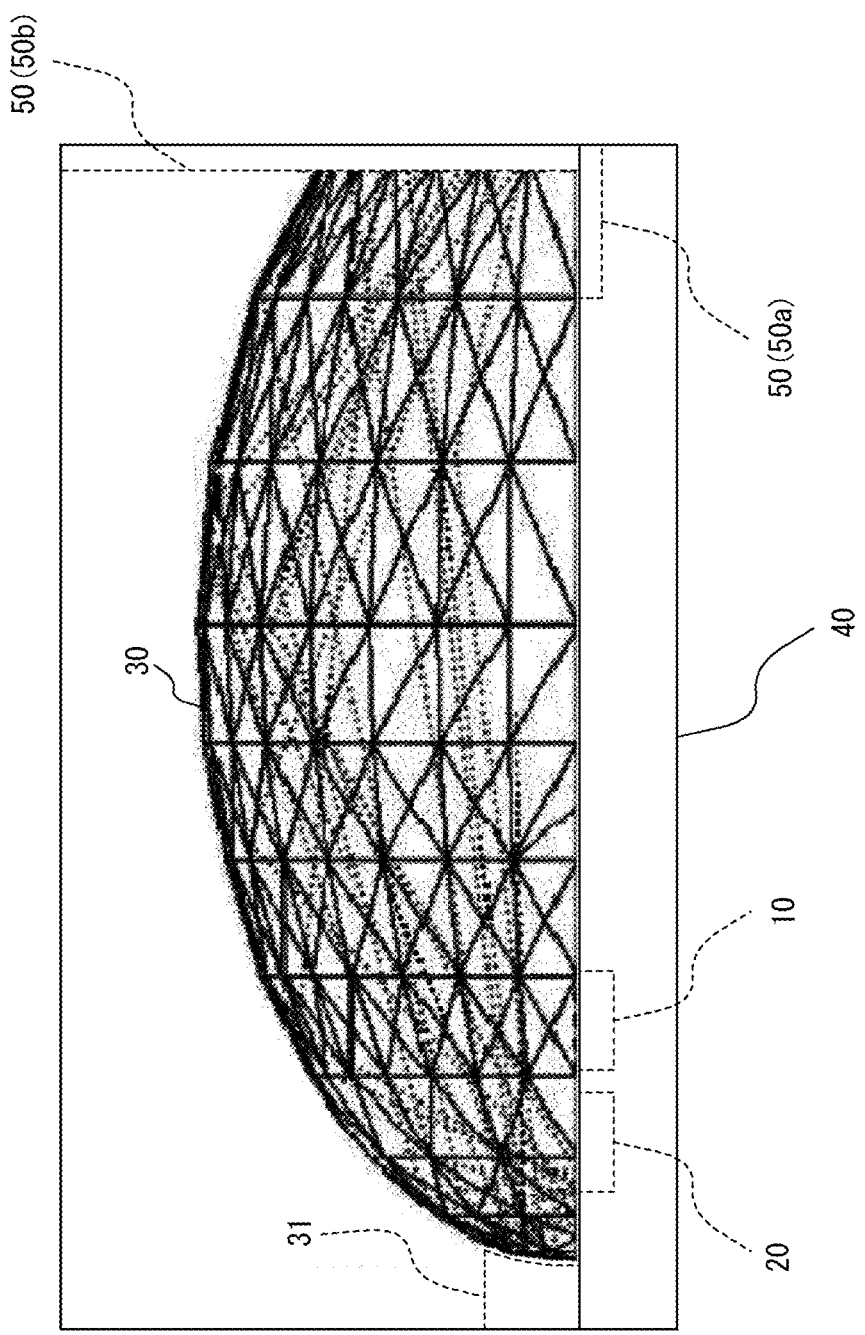
FIG. 3 is a diagram illustrating a configuration example of a gas detection device according to another embodiment of the present disclosure.

FIG. 3 is a diagram illustrating a configuration example of a gas detection device according to a second embodiment. In the gas detection device according to the present embodiment, a mirror 50 is arranged such that a reflecting surface intersects the major axis direction of the spheroid(s). More specifically, the mirror 50 not only includes a part (hereinafter, "mirror 50a") that is arranged in parallel to the major axis direction of the spheroid(s) as in the first embodiment, but also includes a part (hereinafter "mirror 50b") that is arranged such as to intersect the major axis direction of the spheroid(s). Moreover, in the gas detection device according to the present embodiment, a light-emitting section 10 and a light-receiving section 20 are each provided in proximity to a focal point of the spheroid(s) that is not a first focal point F1. In order to avoid repeated description, the following describes configurations differing from the first embodiment.

Figure 4:
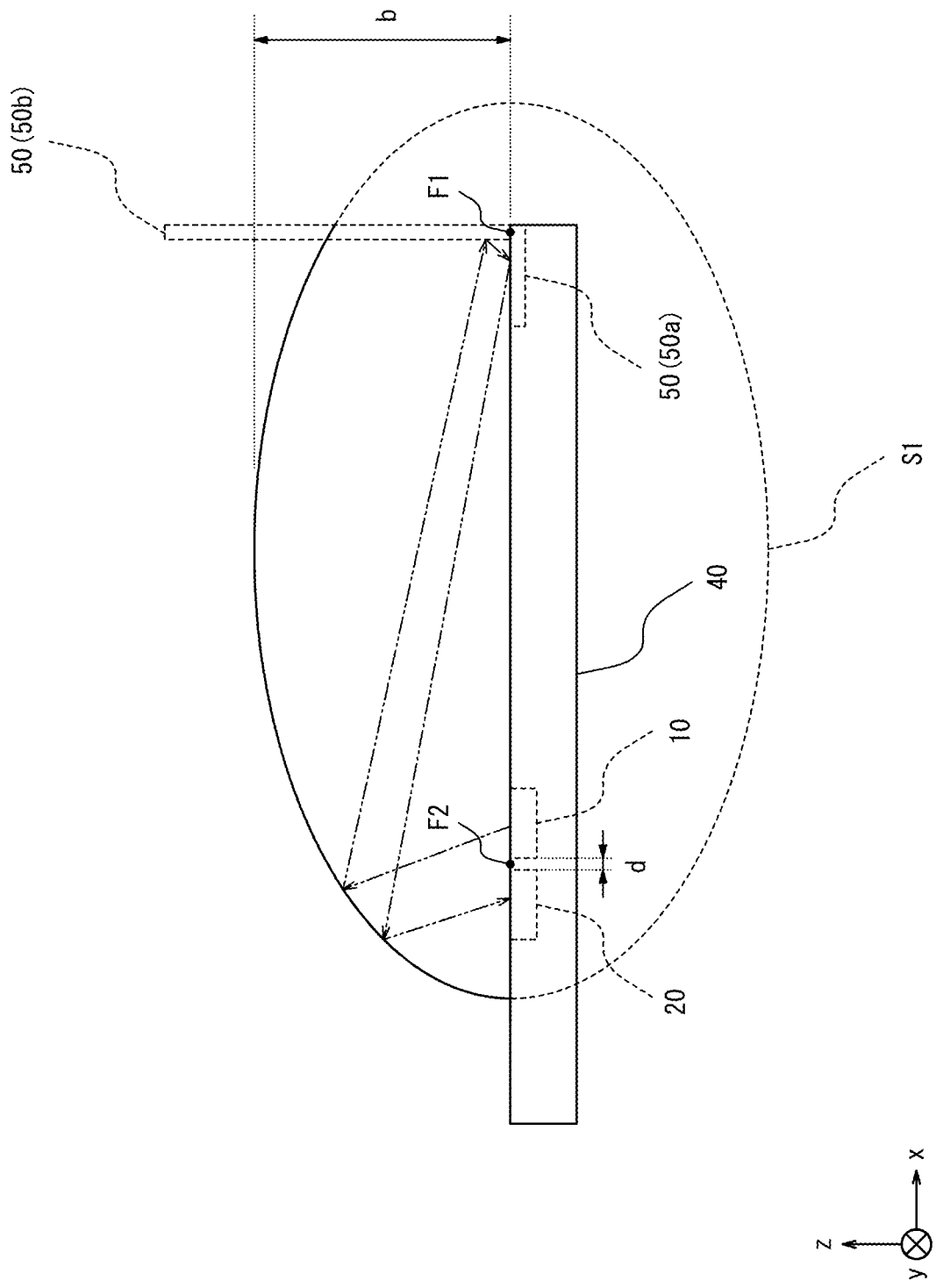
FIG. 4 is a diagram for describing an arrangement example of constituent elements of the gas detection device in FIG. 3.

FIG. 4 is a diagram for describing an arrangement example of constituent elements of the gas detection device in FIG. 3. In the gas detection device according to the present embodiment, a light-guiding section 30 has a shape of part of one spheroid S1 for which a focal point that is not the first focal point F1 is taken to be a second focal point F2 as illustrated in FIG. 3 and FIG. 4. In the example in FIG. 3 and FIG. 4, the mirror 50b is arranged such that a reflecting surface orthogonally intersects the major axis direction of the spheroid. A reflected image of the spheroid S1 by the mirror 50b can be treated as an imaginary spheroid S2 (refer to FIG. 2). Consequently, the light-guiding section 30 in the present embodiment has a shape of a plurality of spheroids for which the total number of actual spheroids and imaginary spheroids is an even number. Moreover, the actual size of the gas detection device according to the present embodiment is half of that in the first embodiment in terms of the spheroid major axis direction. The inclusion of the mirror 50b in the gas detection device according to the present embodiment enables further miniaturization.

In the example illustrated in FIG. 3 and FIG. 4, the mirror 50 is arranged at the first focal point F1, and the light-emitting section 10 and the light-receiving section 20 are each provided in proximity to the second focal point F2. The light-emitting section 10 and the light-receiving section 20 are arranged in parallel to the major axis direction of the spheroid S1 in the same manner as in the first embodiment. The second focal point F2 may be between the light-emitting section 10 and the light-receiving section 20. Moreover, when the distance between the light-emitting section 10 and the light-receiving section 20 is taken to be d as illustrated in FIG. 4, d may be 0 or more. In other words, the light-emitting section 10 and the light-receiving section 20 may be separated from each other or may be arranged adjacently. In a case in which the light-emitting section 10 and the light-receiving section 20 are adjacent, a part where the light-emitting section 10 and the light-receiving section 20 are in contact may overlap with the position of the second focal point F2 as viewed in a direction parallel to the major axis direction of the spheroid S1.

In the present embodiment, light emitted from the light-emitting section 10 is reflected at a reflection point (first reflection point) of the spheroid S1, is then reflected at the reflecting surface of the mirror 50, is then reflected at a reflection point (second reflection point) of the spheroid S1, and then reaches the light-receiving section 20. Reflection at the reflecting surface of the mirror 50 includes reflection at the mirror 50b and reflection at the mirror 50a as illustrated in FIG. 4. The optical paths before and after reflection at the reflecting surface of the mirror 50 are almost the same.

Consequently, in the gas detection device according to the present embodiment, an image of close to ×1 magnification is formed at the light-receiving section 20 irrespective of the positions of the reflecting points (irrespective of the optical path), and thus image blurring can be suppressed.

Figure 5:
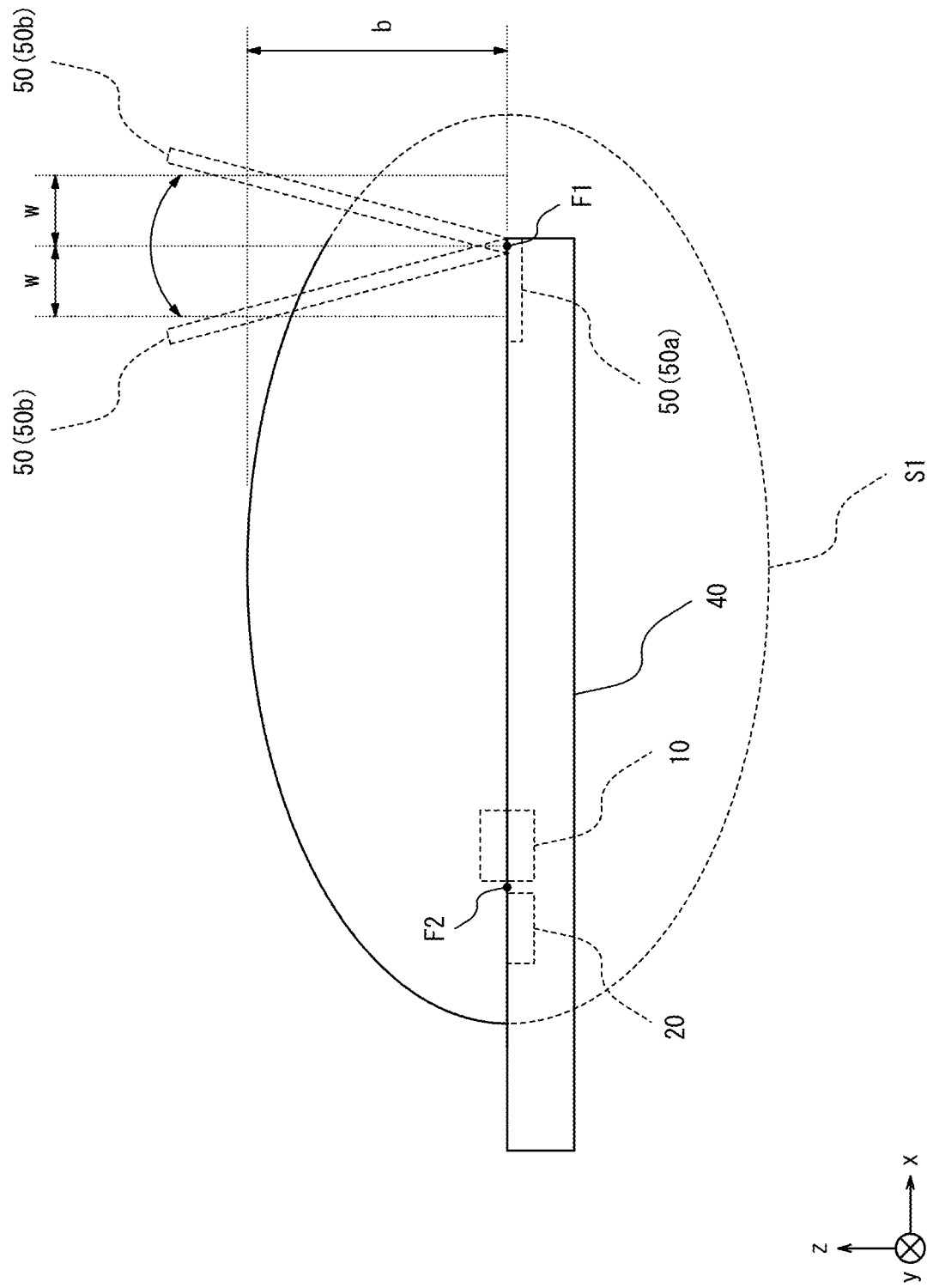
FIG. 5 is a diagram for describing inclination and shape of a mirror of the gas detection device in FIG. 3.

The mirror 50b is a planar mirror or a conic section with a large radius of curvature that is similar to a plane such as subsequently described. The mirror 50b is not limited to being arranged such that the reflecting surface orthogonally intersects the major axis direction of the spheroid and may alternatively be inclined. FIG. 5 is a diagram for describing inclination and shape of the mirror 50b. In a case in which the heights of the light-emitting section 10 and the light-receiving section 20 (i.e., the z-axis direction positions of the light-emitting surface of the light-emitting section 10 and the light-receiving surface of the light-receiving section 20) differ as illustrated in FIG. 5, for example, adjustment can be made through inclination or parallel movement of the mirror 50b such that an image is formed within a desired range at the light-receiving surface of the light-receiving section 20. A difference in height between the light-emitting section 10 and the light-receiving section 20 may arise in a situation in which just one of the light-emitting section 10 and the light-receiving section 20 includes an optical filter, for example.

Figure 10:
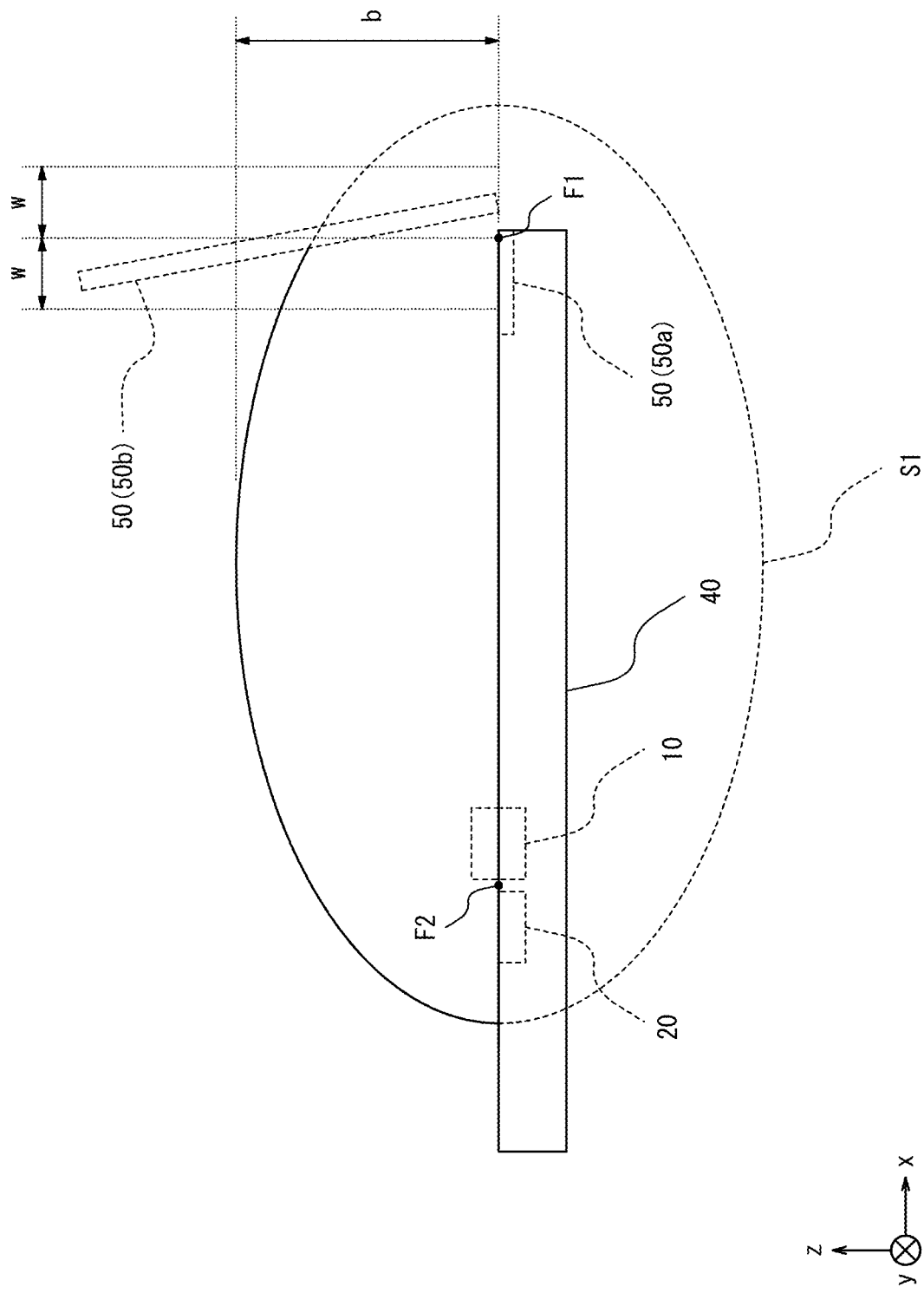
FIG. 10 is a diagram illustrating another example of inclination of the mirror of the gas detection device in FIG. 3.

As illustrated in FIG. 5, the mirror 50b can have an inclination such that the mirror 50b is included inside of a space that is delimited at a width w, forward and backward along the major axis direction of the spheroid, with the first focal point F1 as a reference point. The mirror 50b can also be rotated or moved in parallel (although not illustrated, composition of z-axis centered rotation is also included). Although no specific limitations are placed on w, it is necessary to set w such that paraxial approximation with respect to the spheroid S1 is valid, aberration is suppressed, and an optical image on the light ray path is formed. When the maximum diameter of the spheroid S1 is taken to be Lmax, this is of the order of roughly double a radius of curvature Rtyp that is representative of the spheroid S1, and thus it is necessary for the separation distance between the optical image and the focal point thereof to be sufficiently smaller than Rtyp (i.e., it is preferable that w is $\frac{1}{10}$ of Lmax or less). In other words, the mirror 50b may be arranged such as to be included inside of a space that is delimited at a width of $\frac{1}{10}$ of Lmax or less, forward and backward along the major axis direction of the spheroid, with the first focal point F1 as a reference point. In a case in which the mirror 50b is a conic section, the mirror 50b may be moved within a range of w in the major axis direction with the first focal point F1 at the center at a position separated from the major axis by b in the z-axis direction, and thus may be more than $b^2/W$ as a radius of curvature. Note that the light-guiding section 30 has a shape of part of the spheroid S1 and that the maximum diameter is not included in the light-guiding section 30. However, the maximum diameter can be determined by calculation from the shape of part of the spheroid S1 that the light-guiding section 30 includes, and the calculated value can be used as Lmax described above. Moreover, inclination of the mirror 50b is not limited to a configuration in which the mirror 50b is inclined with the first focal point F1 as a center. So long as the mirror 50b is included inside of the space described above, the inclination may be accompanied by parallel movement in the x-axis direction or the like. For example, the mirror 50b may be inclined as illustrated in FIG. 10.

Figure 6:
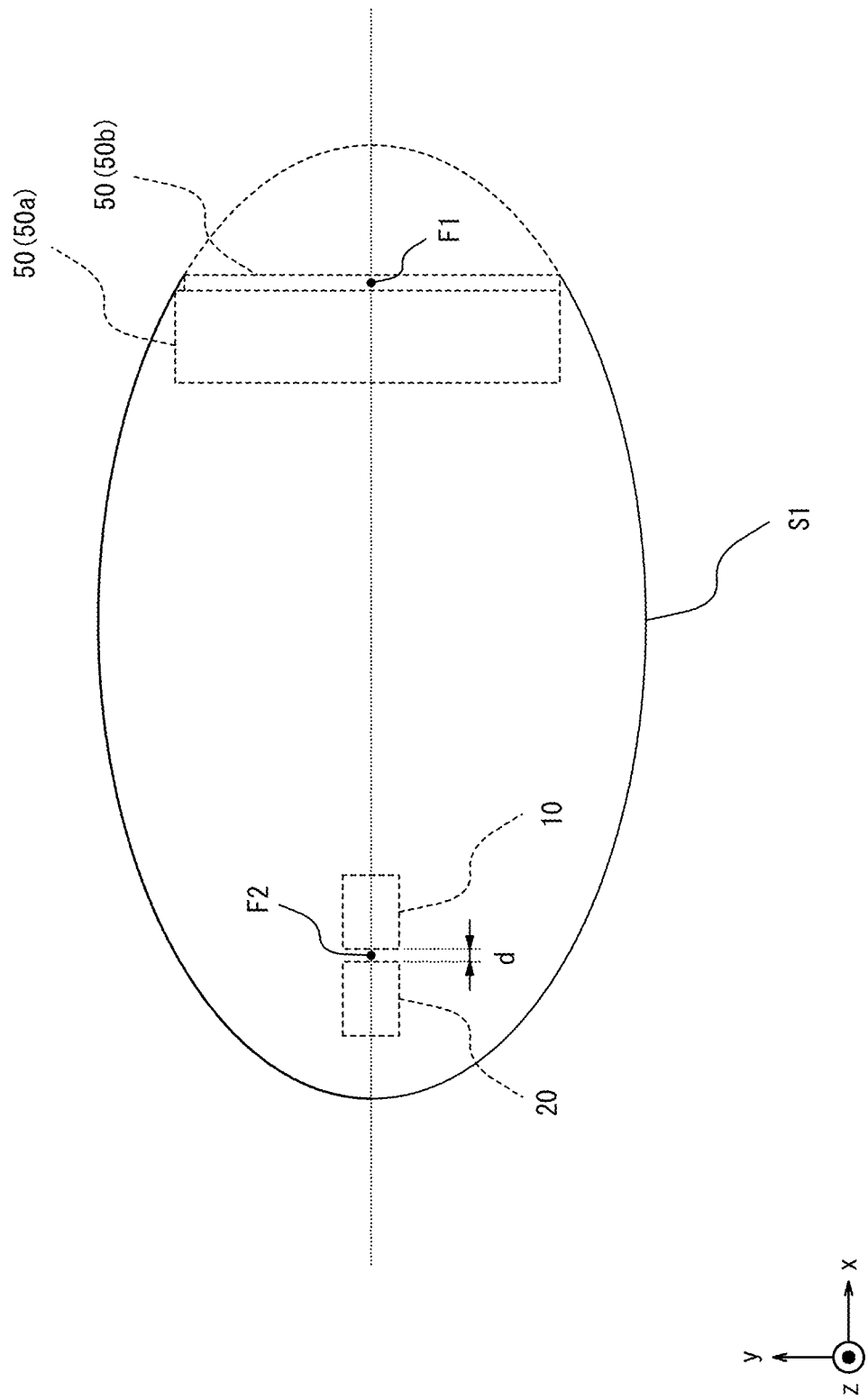
FIG. 6 is a diagram for describing an example of arrangement of a light-emitting section and a light-receiving section of the gas detection device in FIG. 3.
Figure 7:
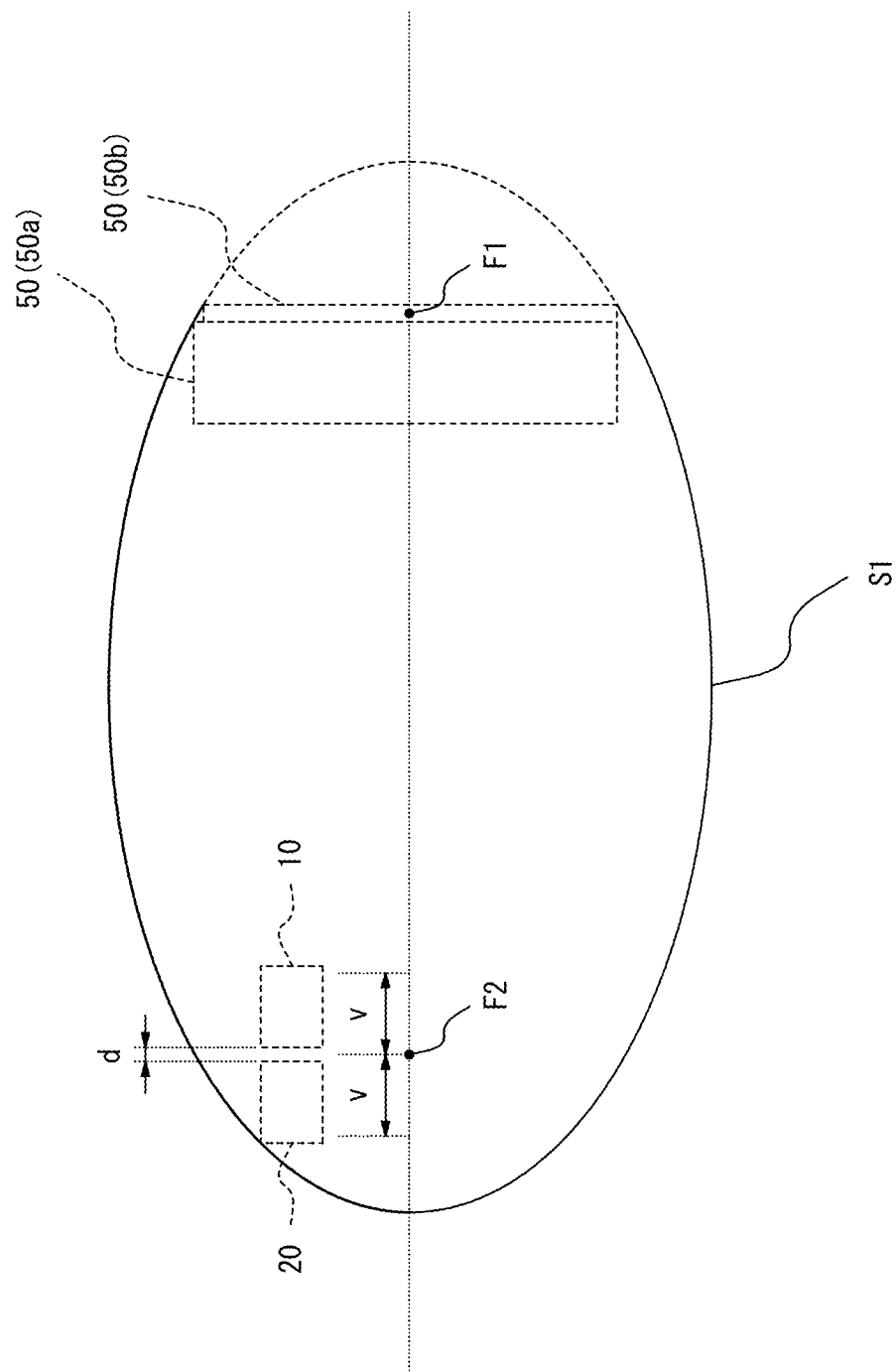
FIG. 7 is a diagram for describing another example of arrangement of the light-emitting section and the light-receiving section of the gas detection device in FIG. 3.
Figure 11:
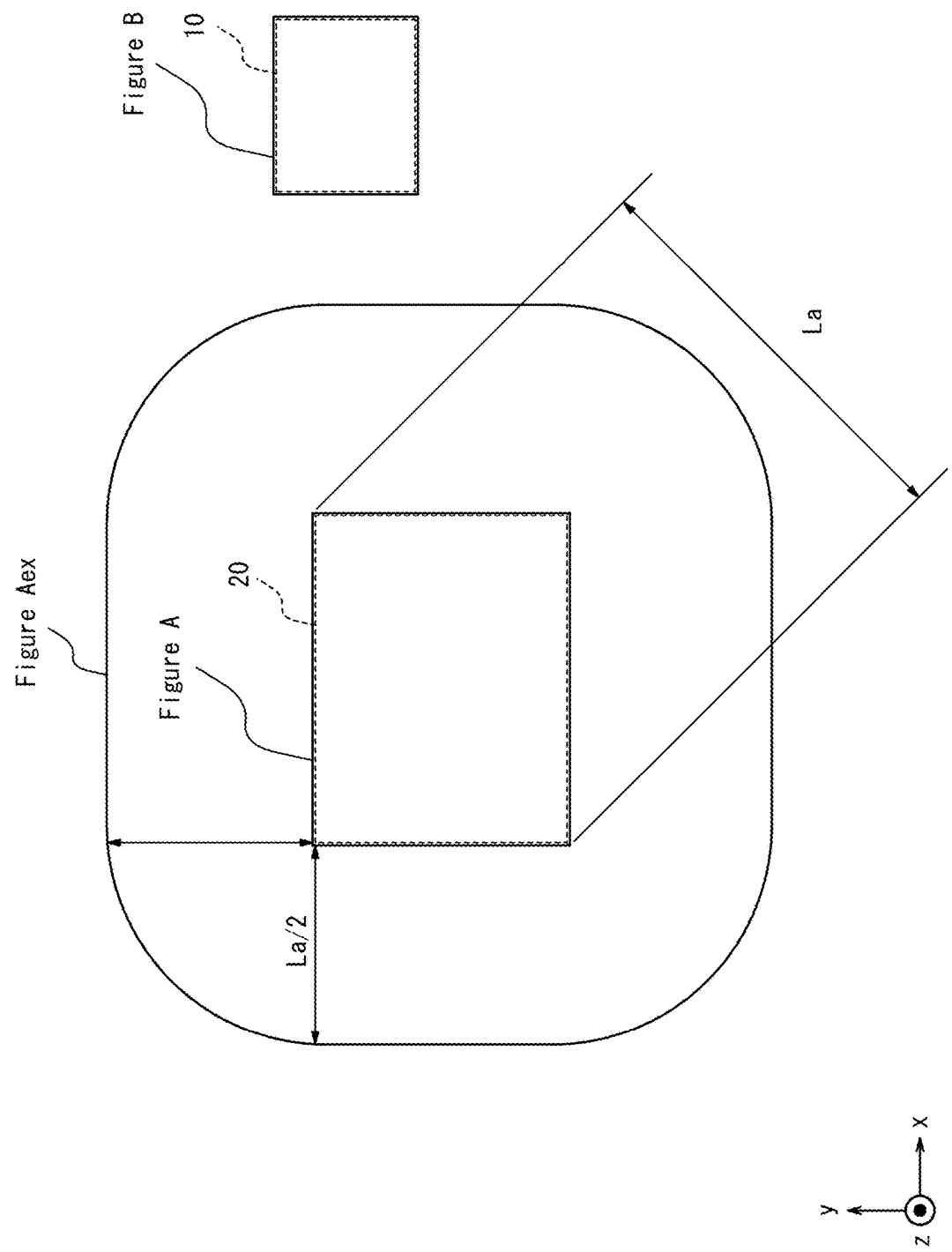
FIG. 11 is a diagram for describing parallel arrangement.

FIG. 6 and FIG. 7 are diagrams for describing arrangement examples of the light-emitting section 10 and the light-receiving section 20. As previously described, the light-emitting section 10 and the light-receiving section 20 are arranged in parallel to the major axis direction of the spheroid (parallel to the x-axis) such that light emitted from the light-emitting section 10 is reflected at an inner surface of the light-guiding section 30 and then reaches the light-receiving section 20. However, no limitations are placed on the positions of the light-emitting section 10 and the light-receiving section 20 in the y-axis direction. Moreover, in a case in which the light-emitting section 10 and the light-receiving section 20 are not of the same size, arrangement of the light-emitting section 10 and the light-receiving section 20 in parallel to the major axis direction of the spheroid is inclusive of a case such as the following. As illustrated in FIG. 11, the sizes of the light-emitting section 10 and the light-receiving section 20 are compared through an overhead view from the z-axis direction, and a figure of whichever is larger is taken to be a figure A and a figure of whichever is smaller is taken to be a figure B. A figure Aex having a perimeter that is expanded by a distance corresponding to half of the maximum length La of the figure A relative to the perimeter of the figure A is defined. The light-emitting section 10 and the light-receiving section 20 are considered to be arranged in parallel to the major axis direction of the spheroid in a case in which moving the figure B in parallel to the major axis direction of the spheroid results in the figure B becoming included in the figure Aex. The light-emitting section 10 and the light-receiving section 20 may be arranged at positions on the major axis of the spheroid such as in the example in FIG. 6. Moreover, even in a case in which the light-emitting section 10 and the light-receiving section 20 are not positioned on the major axis of the spheroid, the light-emitting section 10 and the light-receiving section 20 are included in an arrangement in proximity to the second focal point F2 such as in the example in FIG. 7. Furthermore, the distance d between the light-emitting section 10 and the light-receiving section 20 can be set as 0 regardless of the y-axis direction positions of the light-emitting section 10 and the light-receiving section 20. In other words, the light-emitting section 10 and the light-receiving section 20 can be arranged adjacently. So long as an image can be formed within a desired range at the light-receiving surface of the light-receiving section 20, the second focal point F2 does not necessarily have to be between the light-emitting section 10 and the light-receiving section 20. For example, the second focal point F2 may overlap with the light-emitting section 10, or the second focal point F2 may overlap with the light-receiving section 20. Thus, when the light-emitting section 10 and the light-receiving section 20 are said to be provided in proximity to a focal point, this means that the light-emitting section 10 and the light-receiving section 20 are arranged at positions close to the focal point such that an image is formed within a desired range at the light-receiving surface of the light-receiving section 20. Moreover, the light-emitting section 10 and the light-receiving section 20 are arranged within a range v in the major axis direction with an x-axis coordinate of the second focal point F2 as a center (refer to FIG. 7). Although no specific limitations are placed on v, it is necessary to set v such that paraxial approximation with respect to the spheroid S1 is valid, aberration is suppressed, and an optical image on the light ray path is formed. When the maximum diameter of the spheroid S1 is taken to be Lmax, this is of the order of roughly double a radius of curvature Rtyp that is representative of the spheroid S1, and thus it is necessary for the separation distance between the optical image and the focal point thereof to be sufficiently smaller than Rtyp (i.e., it is preferable that v is $\frac{1}{10}$ of Lmax or less). A light emission center of the light-emitting section 10 and a light reception center of the light-receiving section 20 should each be arranged within the range v in the major axis direction with the x-axis coordinate of the second focal point F2 as a reference point.

Figure 8:
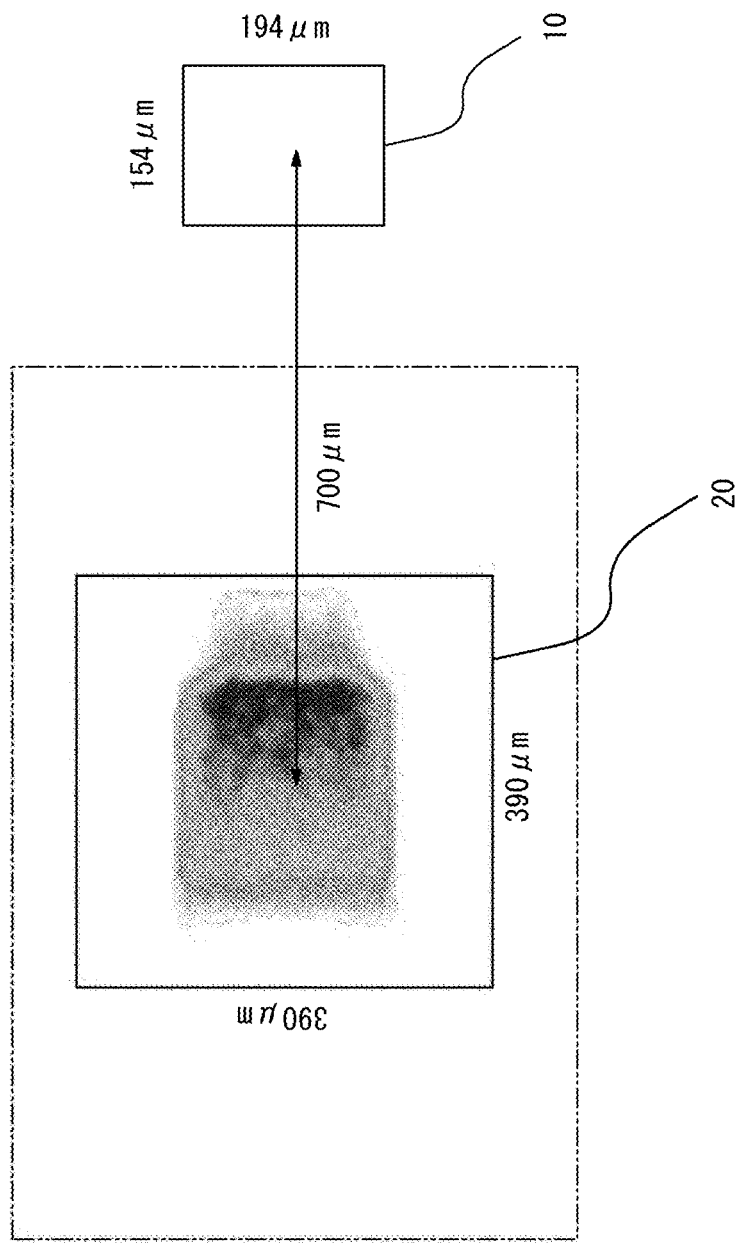
FIG. 8 is a diagram illustrating simulation results for the gas detection device in FIG. 3.

FIG. 8 is a diagram illustrating simulation results for the gas detection device according to the present embodiment.

In a gas detection device configured as illustrated in FIG. 3, a simulation was performed to calculate the intensity of light at the light-receiving section 20 when light was emitted from the light-emitting section 10. The light-emitting section 10 and the light-receiving section 20 were set such that the distance between centers thereof was 700 μm. Moreover, the size of the light-emitting surface of the light-emitting section 10 was set as 154 μm in the x-axis direction and 194 μm in the y-axis direction. Furthermore, the size of the light-receiving surface of the light-receiving section 20 was set as 390 μm in both the x-axis direction and the y-axis direction. The major axis of the spheroid S1 included in the light-guiding section 30 was 18.00 mm. The minor axis was 14.94 mm. The mirror 50 was a planar mirror and was arranged orthogonally to the major axis of the spheroid at the position of the first focal point F1. As illustrated in FIG. 8, the simulation results demonstrate that high intensity light can be received at a central part of the light-receiving surface. Note that darker color (blacker color) indicates greater light intensity. Calculation of light intensity was performed for a region encompassed by a double-dotted line in FIG. 8, which is inclusive of the light-receiving section 20. Energy efficiency was 96.3% in a case in which the reflectance of the light-guiding section 30 was taken to be 100%, and was 81.8% even in a case in which the reflectance of the light-guiding section 30 was taken to be 96%. This simulation demonstrates that in the gas detection device according to the present embodiment, high intensity light can be received within a certain range at the light-receiving surface, and energy efficiency is high.

A number of simulations were performed in which the arrangement of the light-emitting section 10 and the light-receiving section 20 in the gas detection device was changed. As a result, it was found that providing the light-emitting section 10 at a closer position than the light-receiving section 20 to the first focal point F1 is preferable for increasing energy efficiency. For example, in a case in which the light-emitting section 10 and the light-receiving section 20 are arranged such as to sandwich the second focal point F2 therebetween, it is preferable that the light-emitting section 10 is arranged at a central side of the spheroid (i.e., closer to the first focal point F1) as illustrated in FIG. 4 rather than being arranged at a peripheral side of the spheroid.

The gas detection device according to the present embodiment can suppress image blurring as a result of an image of close to ×1 magnification being formed at the light-receiving section 20. Moreover, the gas detection device according to the present embodiment can be made more compact than in the first embodiment as a result of including the mirror 50b. Accordingly, the gas detection device according to the present embodiment is compact and can perform accurate measurement of a gas that is to be detected, and is particularly useful in applications in which miniaturization is required.

In the example in FIG. 4, the light-guiding section 30 has a shape of part of one spheroid S1. However, the number of spheroids is not limited to 1. In the first embodiment, it was necessary for the total number of a plurality of spheroids to be an even number. In the present embodiment, the number of spheroids inclusive of imaginary spheroids is an even number as a result of a reflected image through the mirror 50b. Accordingly, the number of spheroids is not limited to and does not have to be an even number in the present embodiment. Note that in the case of a plurality of spheroids, the major axis thereof is shared in the present embodiment.

Although embodiments of the present disclosure have been described based on the various drawings and examples, it should be noted that a person of ordinary skill in the art could easily make various modifications and revisions based on the present disclosure. Accordingly, such modifications and revisions should also be considered to be included within the scope of the present disclosure. For example, functions and the like included in various constituent parts, etc., may be rearranged so long as they are logically consistent. Moreover, a plurality of constituent parts, etc., may be combined as a single part or may be split up.

The invention claimed is:

1. A gas detection device comprising: a light-emitting section; a light-receiving section; and a light-guiding section that guides light from the light-emitting section to the light-receiving section, wherein
   the light-guiding section includes a mirror and has a shape of part of at least one spheroid,
   the mirror is provided at a position of a first focal point of the spheroid or in proximity to the first focal point,
   the light-emitting section and the light-receiving section are each provided at a position of a second focal point of the spheroid or in proximity to the second focal point,
   the light-emitting section and the light-receiving section are arranged in parallel to a major axis direction of the spheroid,
   the mirror is arranged along the major axis direction of the spheroid such that a reflecting surface is parallel to the major axis direction of the spheroid.

2. The gas detection device according to claim 1, wherein
   the mirror includes a part arranged such that a reflecting surface intersects the major axis direction of the spheroid, and
   the part of the mirror is arranged such that when a maximum diameter of the spheroid is taken to be Lmax, the part of the mirror is included inside of a space that is delimited at a width of ⅒ of Lmax, forward and backward along the major axis direction of the spheroid, with the first focal point as a reference point.

3. The gas detection device according to claim 2, wherein the part of the mirror is arranged such that the reflecting surface orthogonally intersects the major axis direction of the spheroid.

4. The gas detection device according to claim 2, wherein
   the light-guiding section has a shape of part of one spheroid, and
   the light-emitting section and the light-receiving section are each provided in proximity to the second focal point along the major axis direction of the spheroid.

5. The gas detection device according to claim 4, wherein the second focal point is between the light-emitting section and the light-receiving section.

6. The gas detection device according to claim 4, wherein the light-emitting section and the light-receiving section are arranged adjacently.

7. The gas detection device according to claim 2, wherein the light-emitting section is provided at a position that is closer than the light-receiving section to the first focal point.

8. The gas detection device according to claim 1, wherein
   the light-guiding section has a shape of part of two spheroids that share the first focal point,
   the second focal point is a focal point of one of the two spheroids
   a third focal point is a focal point of the other of the two spheroids, and the light-emitting section is provided at a position of the second focal point and the light-receiving section is provided at a position of the third focal point.

9. The gas detection device according to claim 1, wherein the light-emitting section includes a semiconductor light-emitting element, and the light-receiving section includes a semiconductor light-receiving element.

10. The gas detection device according to claim 1, wherein an optical image on the light ray path is formed within the light-receiving surface of the light-receiving section.

* * * * *